US010650933B2

(12) United States Patent
Singh

(10) Patent No.: US 10,650,933 B2
(45) Date of Patent: May 12, 2020

(54) RACK FOR UNDERWATER STORAGE OF SPENT NUCLEAR FUEL

(71) Applicant: Holtec International, Marlton, NJ (US)

(72) Inventor: Krishna P. Singh, Hobe Sound, FL (US)

(73) Assignee: HOLTEC INTERNATIONAL, Marlton, NJ (US)

(*) Notice: Subject to any disclaimer, the term of this patent is extended or adjusted under 35 U.S.C. 154(b) by 868 days.

(21) Appl. No.: 14/935,221

(22) Filed: Nov. 6, 2015

(65) Prior Publication Data

US 2016/0133346 A1   May 12, 2016

Related U.S. Application Data

(60) Provisional application No. 62/076,138, filed on Nov. 6, 2014.

(51) Int. Cl.
*G21C 19/00* (2006.01)
*G21C 19/07* (2006.01)

(52) U.S. Cl.
CPC .................... *G21C 19/07* (2013.01)

(58) Field of Classification Search
CPC ........................................... G21C 19/07
USPC ....................................... 376/272
See application file for complete search history.

(56) References Cited

U.S. PATENT DOCUMENTS

| 4,594,216 | A | 6/1986 | Feutrel |
| 6,064,710 | A | 5/2000 | Singh |
| 8,548,112 | B2 | 10/2013 | Singh et al. |
| 8,576,976 | B2 | 11/2013 | Singh et al. |
| 8,712,001 | B2 | 4/2014 | Singh et al. |
| 2009/0207962 | A1* | 8/2009 | Maeda ............... G21C 19/07 376/272 |
| 2010/0061502 | A1 | 3/2010 | Yamasaki et al. |
| 2011/0051883 | A1* | 3/2011 | McInnes ............ G21C 19/07 376/462 |

FOREIGN PATENT DOCUMENTS

KR         900008687 B1     11/1990

OTHER PUBLICATIONS

Corresponding International Search Report and Written Opinion for PCT/US15/59580 dated Mar. 11, 2016.
Search Report for Corresponding CN Application No. 2015800601538 dated Jul. 25, 2018. CN.

* cited by examiner

*Primary Examiner* — Marshall P O'Connor
(74) *Attorney, Agent, or Firm* — The Belles Group, P.C.

(57) ABSTRACT

A fuel rack for nuclear fuel assemblies includes a base plate and an array of cells for holding fuel assemblies. The array of cells includes: a plurality of first slotted plates slidably interlocked with one another to form a top portion of the array of cells, the plurality of first slotted plates formed of a first material; a plurality of second slotted plates slidably interlocked with one another to form a middle portion of the array of cells, the plurality of second slotted plates formed of a second material, the first and second materials being metallurgically incompatible; and a plurality of third slotted plates slidably interlocked with one another to form a bottom portion of the array of cells, the plurality of third slotted plates formed of the first material and connected to a top surface of the base plate.

28 Claims, 12 Drawing Sheets

RACK FOR UNDERWATER STORAGE OF SPENT NUCLEAR FUEL

CROSS REFERENCE TO RELATED APPLICATIONS

Priority is claimed U.S. Provisional Patent Application No. 62/076,138, filed Nov. 6, 2014, the disclosure of which is incorporated herein by reference in its entirety.

FIELD OF THE INVENTION

The field of the present invention relates to apparatus and methods for storing high level radioactive waste, and specifically to apparatus and methods for storing radioactive fuel assemblies.

BACKGROUND OF THE INVENTION

High density spent fuel racks are used in Light Water Reactor (LWR) installations to store nuclear fuel assemblies underwater in deep ponds of water known as Spent Fuel Pools. The current state-of-the-art in the design of Fuel Racks is described in "Management of Spent Nuclear Fuel," Chapter 53, by Drs. Tony Williams and Kris Singh in the ASME monograph *Companion Guide to the ASME Boiler & Pressure Vessel Code*, Third (3rd) Edition, edited by K. R. Rao (2009). As described in the above mentioned chapter, contemporary fuel racks are cellular structures mounted on a common Baseplate supported on four or more pedestals and made up of a rectangular assemblage of "storage cells" with plates (or panels) of neutron absorber affixed to the walls separating each cell. The neutron absorber serves to control the reactivity of the fuel assemblies arrayed in close proximity to each other. The neutron absorber is typically made of a metal matrix composite such as aluminum and boron carbide, the boron serving to capture the thermalized neutrons emitted by the fuel to control reactivity. Typical areal density of the B-10 isotope (the neutron capture agent in boron carbide) in the absorber plates used in BWR and PWR racks are 0.02 and 0.03 gm/sq. cm, respectively.

The overwhelming majority of fuel racks in use in the United States have discrete panels of neutron absorber secured to the side walls of the storage cell boxes. To eliminate the separate neutron absorber panels that must be affixed to the cell walls, an alternative design that uses borated stainless steel that renders both neutron capture and structural function, has been used in the industry but failed to gain wide acceptance because of the limited quantity of boron that can be introduced in the stainless steel grain structure and other structural limitations. In view of the shortcomings of the alternative designs using borated stainless steel, different alternative designs are needed to fuel racks in order to eliminate the need to use separate neutron absorber panels.

SUMMARY OF THE INVENTION

The present invention is directed toward a fuel rack for the storage of spent nuclear fuel. The rack employs a plurality of slotted plates to form an array of cells for storing nuclear fuel assemblies. The slotted plates are constructed from two different types of materials which are metallurgically incompatible, one which provides strength to the array of cells and the other which is a neutron absorber. The design reduces the complexity of the design for fuel racks, while at the same time still providing the necessary safety systems for the long term storage of nuclear fuel.

In one aspect, the invention may be a fuel rack for nuclear fuel assemblies, the fuel rack including a base plate and an array of cells for holding the fuel assemblies. The array of cells includes: a plurality of first slotted plates slidably interlocked with one another to form a top portion of the array of cells, the plurality of first slotted plates formed of a first material; a plurality of second slotted plates slidably interlocked with one another to form a middle portion of the array of cells, the plurality of second slotted plates formed of a second material, the first and second materials being metallurgically incompatible; and a plurality of third slotted plates slidably interlocked with one another to form a bottom portion of the array of cells, the plurality of third slotted plates formed of the first material and connected to a top surface of the base plate.

In another aspect, the invention may be a nuclear fuel storage apparatus including: a fuel assembly and a fuel rack. The fuel assembly has a top section, a middle section, and a bottom section, with nuclear fuel being stored within the middle section. The fuel rack includes a base plate and an array of cells, with the fuel assembly located in a first cell of the array of cells. The array of cells includes: a plurality of first slotted plates slidably interlocked with one another to form a top portion of the array of cells, the plurality of first slotted plates formed of a first material; a plurality of second slotted plates slidably interlocked with one another to form a middle portion of the array of cells, the plurality of second slotted plates formed of a second material, the first and second materials being metallurgically incompatible, and the middle section of the fuel assembly located entirely within the middle portion of the first cell of the array of cells; and a plurality of third slotted plates slidably interlocked with one another to form a bottom portion of the array of cells, the plurality of third slotted plates formed of the first material and connected to a top surface of the base plate.

In still another aspect, the invention may be a fuel rack for nuclear fuel assemblies, the fuel rack including: a base plate; an array of cells for holding fuel assemblies, the array of cells including: a plurality of first slotted plates slidably interlocked with one another to form a top portion of the array of cells, the plurality of first slotted plates welded together and formed of a first material; a plurality of second slotted plates slidably interlocked with one another to form a middle portion of the array of cells, the plurality of second slotted plates formed of a second material, the first and second materials being metallurgically incompatible; and a plurality of third slotted plates slidably interlocked with one another to form a bottom portion of the array of cells, the plurality of third slotted plates formed of the first material and welded to a top surface of the base plate; and a plurality of tie members, each tie member welded to each of the top and bottom portions of the array of cells.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The foregoing summary, as well as the following detailed description of the exemplary embodiments, will be better understood when read in conjunction with the appended drawings. It should be understood, however, that the invention is not limited to the precise arrangements and instrumentalities shown in the following figures.

DETAILED DESCRIPTION OF THE INVENTION

Figure 1:
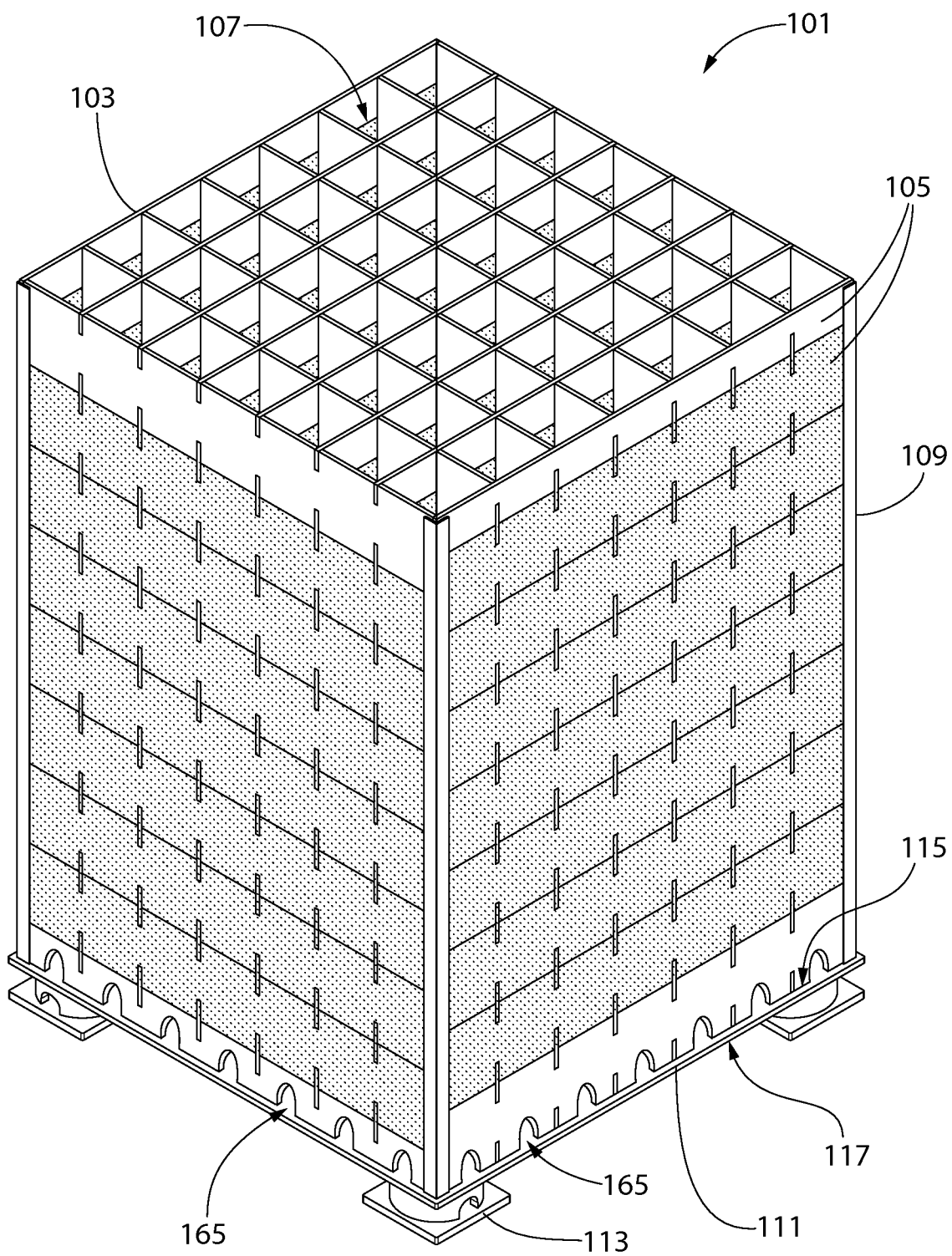
FIG. 1 is a perspective view of a first fuel rack for nuclear fuel assemblies.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "left," "right," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combinations of features that may exist alone or in other combinations of features; the scope of the invention being defined by the claims appended hereto.

Turning in detail to the drawings, a fuel rack 101 including an array of cells 103 is shown in FIG. 1. The array of cells 103 is formed by slotted plates 105 arranged in interlocking arrangement. In the embodiment shown, each storage cell 107 in the array of cells 103 has a square profile in plan view, with all the cells having the same dimensions. However, in certain embodiments, each storage cell 107 in the array of cells 103 may have an alternative profile shape, including a rectangular profile shape and a hexagonal profile shape, among others. In certain embodiments, the storage cells 107 in the array of cells 103 may vary in size. The fuel rack 101 also includes tie members 109 affixed to the array of cells 103 to extend along the external surface of the array of cells 103. The tie members extend substantially the entire height of the array of cells 103 to provide vertical stiffness to the interlocking slotted plates 105. In certain embodiments, the tie members 109 may be located within the storage cells 107 and affixed to the array of cells 103. In still other embodiments, smaller coupling elements may be used which couple adjacent ones of the slotted plates 105 together instead of the tie members 109. The fuel rack 101 also includes a base plate 111, and the array of cells 103 is connected to a top surface 115 of the base plate 111.

Support pedestals 113 are coupled to the bottom surface 117 of the base plate 111. The support pedestals 113 provide space underneath the base plate 111 for the circulation of fluid up and through the array of cells 103.

Figure 2:
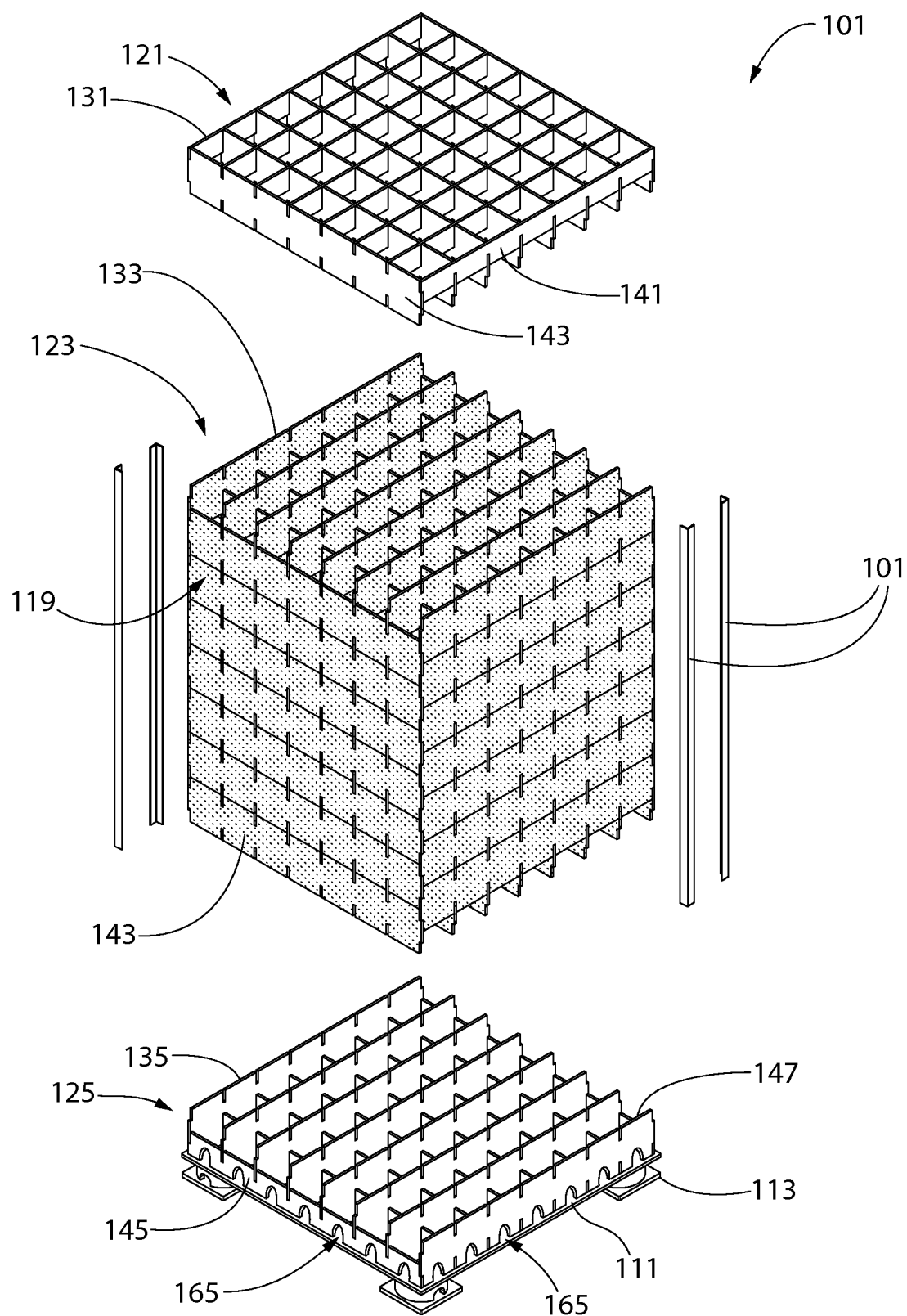
FIG. 2 is a partial exploded view of the fuel rack of FIG. 1.
Figure 4A:
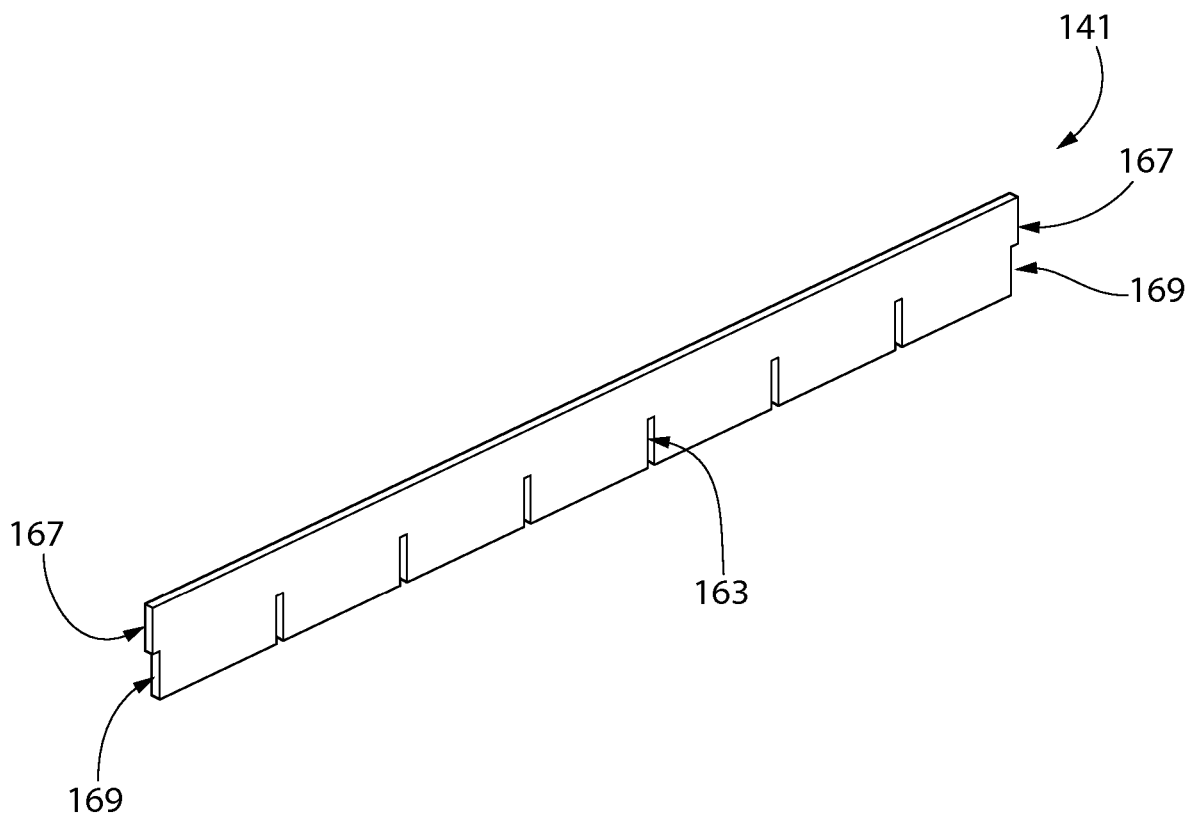
FIG. 4A-D are slotted plates for the fuel rack of FIG. 1.
Figure 4B:
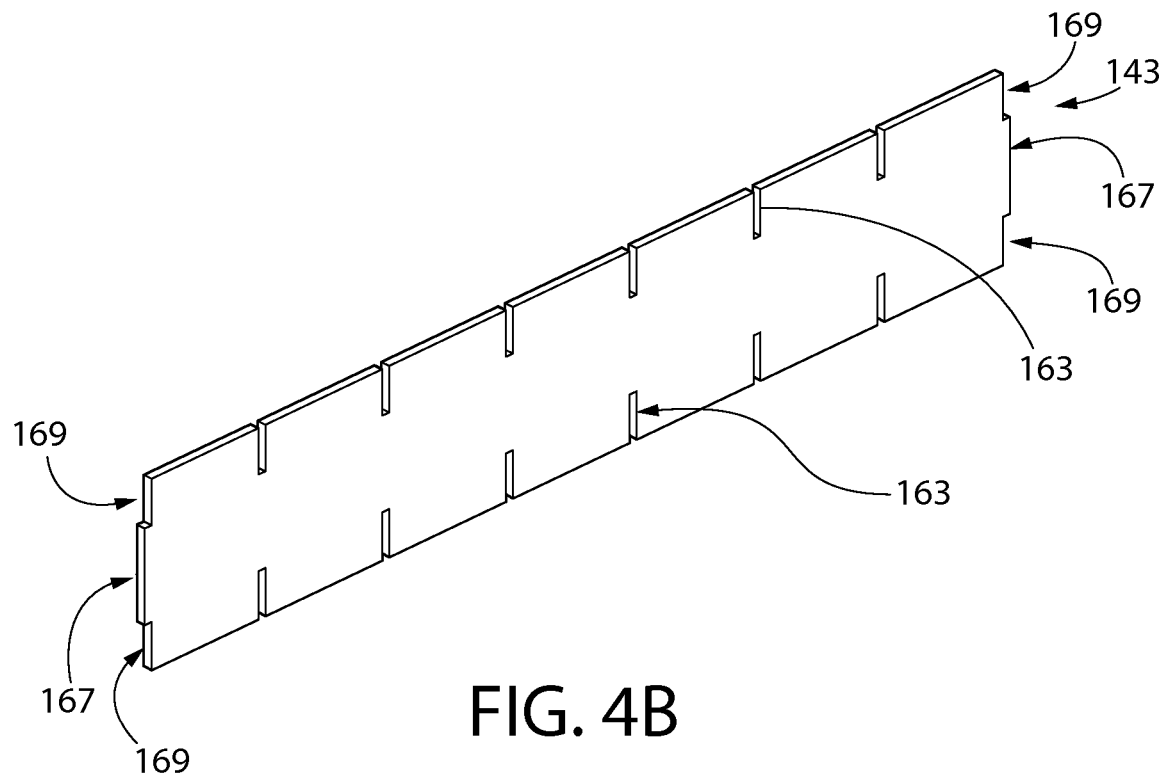
Figure 4C:
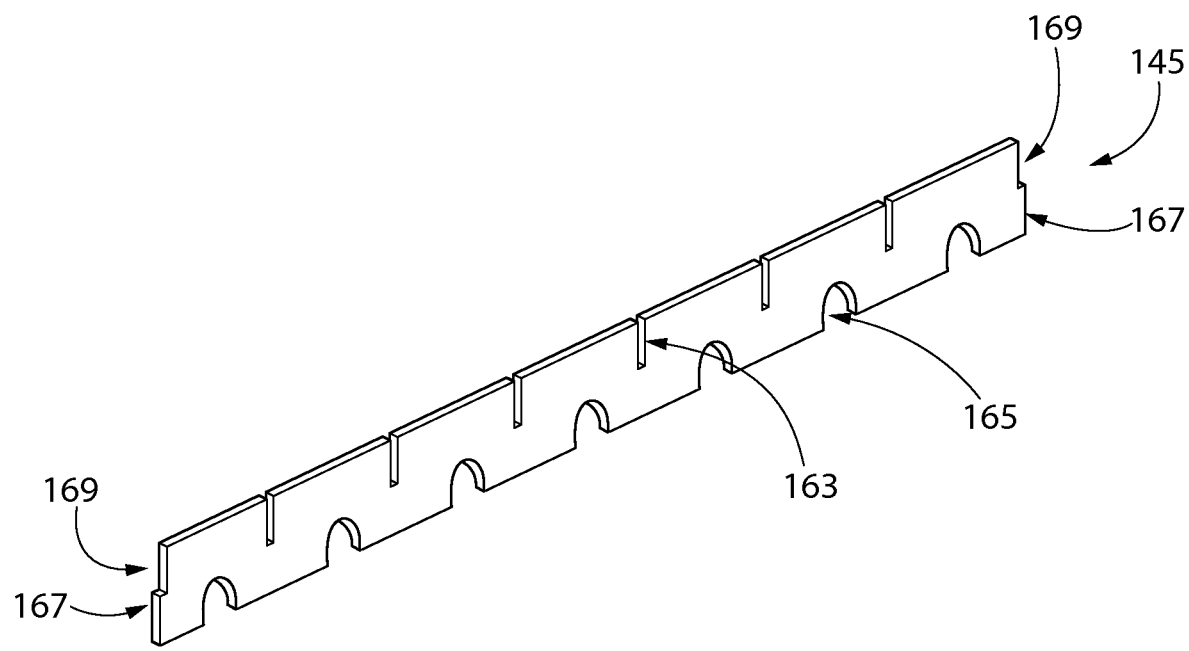
Figure 4D:
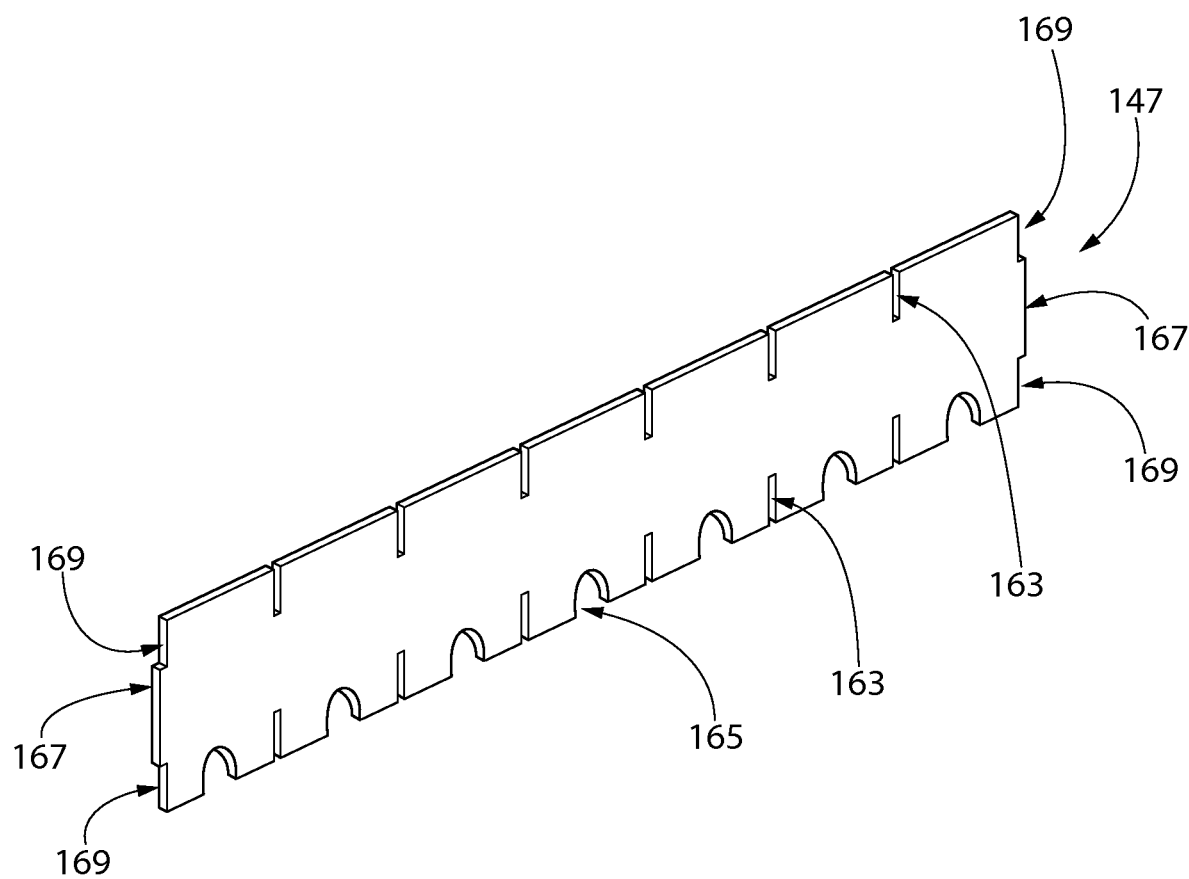

An exploded version of the fuel rack 101 is shown in FIG. 2. The array of cells 103 is shown separated into a top portion 121, a middle portion 123, and a bottom portion 125. The entire array of cells 103 may be formed out of four different types of slotted plates. A plurality of first slotted plates 131 are slidably interlocked with one another to form the top portion 121 of the array of cells 103; a plurality of second slotted plates 133 are slidably interlocked with one another to form the middle portion 123 of the array of cells 103; and a plurality of third slotted plates 135 are slidably interlocked with one another to form the top portion 125 of the array of cells 103. Each of the plurality of first, second, and third slotted plates 131, 133, 135 include one or more of the types of slotted plates shown in FIGS. 4A-D. As shown, in the top portion 121, the plurality of first slotted plates 131 includes a plurality of top slotted plates 141 (FIG. 4A) and a plurality of middle slotted plates 143 (FIG. 4B); in the middle portion 123, the plurality of second slotted plates 133 includes a plurality of the middle slotted plates 143 (FIG. 4B); and in the bottom portion 125, the plurality of third slotted plates 135 includes a plurality of bottom half slotted plates 145 (FIG. 4C) and a plurality of bottom full slotted plates 147 (FIG. 4D).

The plurality of first slotted plates 131 and the plurality of third slotted plates 135 are constructed from a first material, and the plurality of second slotted plates 133 are constructed from a second material which is metallurgically incompatible with the first material. As used herein, the term "metallurgically incompatible" means that the two materials are not compatible to the extent that they cannot be joined by a weld. The inability to join two materials by a weld arises from the state of the art of welding, in which no weld material and/or no technique are known to exist that could be used to weld the two materials together. In certain embodiments, the first material may be stainless steel and the second material may be a metal matrix composite material. The metal matrix composite material may be, in certain embodiments, a aluminum/boron carbide metal matrix composite material, an non-limiting example of which is a boron impregnated aluminum. One such suitable material for the metal matrix composite material is sold under the tradename Metamic®. The tie members 109, the base plate 111, and the pedestals 113, in certain embodiments, are also formed from the first material.

The plurality of first slotted plates 131 of the top portion 121 are welded together along adjacent edges. Welding the plurality of first slotted plates 131 provides overall structure to the top portion 121 of the array of cells 103. The plurality of third slotted plates 135 of the bottom portion 125 are coupled to the base plate 111. In certain embodiments, the plurality of third slotted plates 135 may be welded to the base plate 111. By welding the plurality of third slotted plates 135 to the base plate 111, the base plate 111 is provided with additional flexural strength, which may be needed when the storage rack 101 is loaded with fuel assemblies. In certain embodiments, the plurality of third slotted plates 135 may also be welded together along adjacent edges. Conventional welding materials and processes may be used for these welds when the first material is stainless steel.

The plurality of second slotted plates 133 may be welded together at intersecting slots, insofar as a welding process is known for the second material. When the second material is one such as Metamic®, welding may be performed as taught in WO2014106044, published Jul. 3, 2014 and entitled "Joining process for neutron absorbing materials."

The tie members 109 extend along an external surface 119 of the array of cells 103 and are affixed to the top portion 121 and the bottom portion 125 of the array of cells 103. Particularly, the tie members 109 are affixed to one or more of the plurality of first slotted plates 131 and to one or more of the plurality of first slotted plates 135 that are outward-facing. The tie members 109 may be affixed to the top portion 121 and the bottom portion 125 by welding. The tie members 109 therefore need not be directly affixed to any of the plurality of second slotted plates 133 in the middle portion 123 of the array of cells 103 to stabilize the entire array of cells 103. In certain embodiments, fasteners such as screws and/or brackets may couple the tie members 109 to the top portion 121 and/or the bottom portion 125 of the array of cells 103.

The tie members 109 serve to provide vertical stiffness to the array of cells 103. As indicated above, because the second plurality of slotted plates 133 is made from a second material that is metallurgically incompatible with the first material of the first and third plurality of slotted plates 131, 135, the middle portion 123 cannot be welded to the top or bottom portions 121, 125 of the array of cells 103. Thus, by using the tie members 109 to tie the top and bottom portions 121, 125 of the array of cells 103 together, the second plurality of slotted plates 133 in the middle portion 123 of the array of cells 103 may be securely held in place, and additional stiffness is thereby provided to the entire array of cells 103 and to the fuel rack 101 itself.

As shown, the tie members 109 are affixed to corners of the array of cells 103, and only four tie members 109 are shown in the depicted embodiment. In certain embodiments, the tie members 109 may be affixed at different locations on the array of cells 103. And in certain embodiments, more or fewer tie members 109 may be used.

Figure 3:
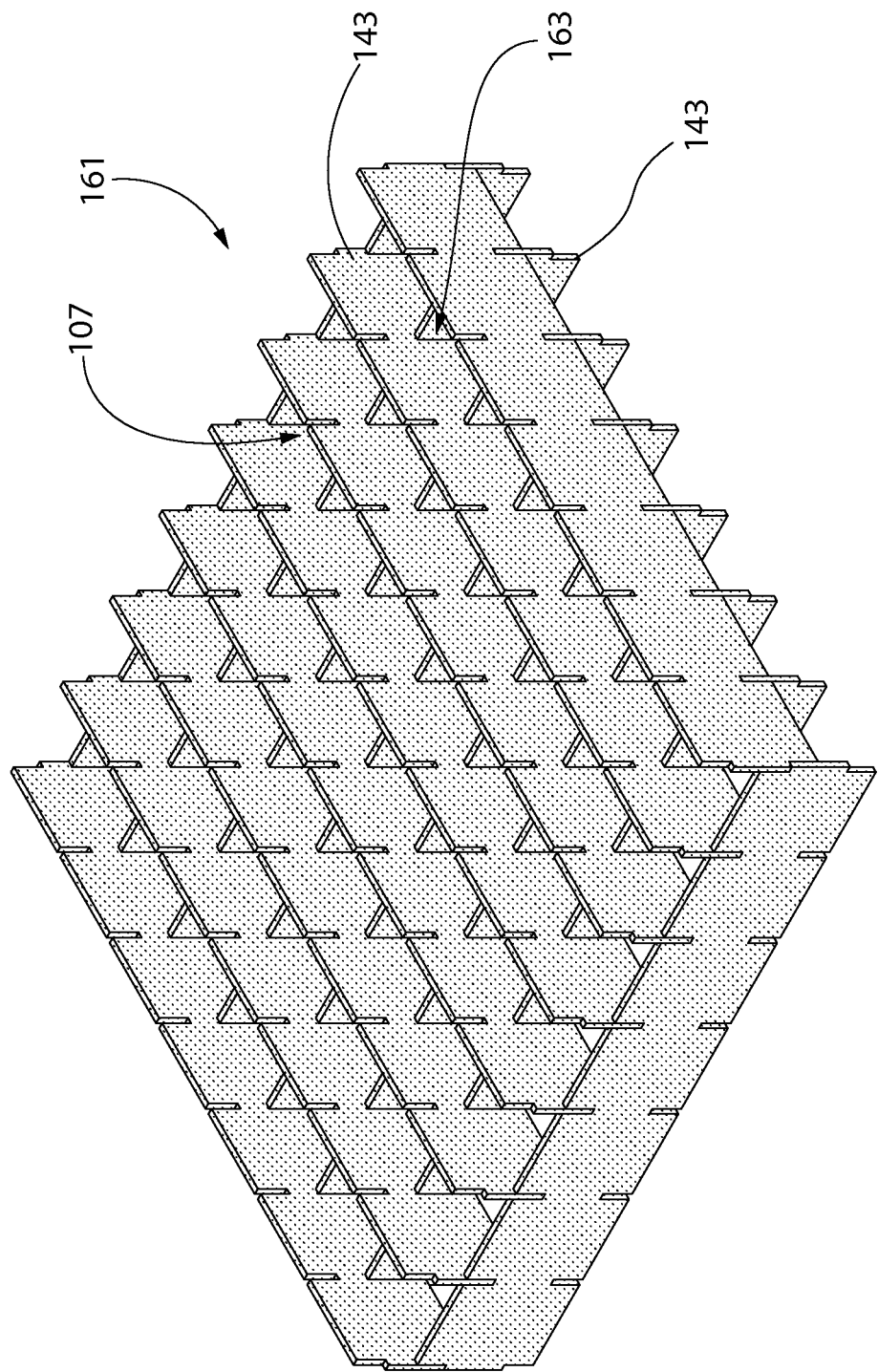
FIG. 3 is a perspective view of interlocked slotted plates for the fuel rack of FIG. 1.

A middle segment 161 of the middle portion 123 of the array of cells 103 is shown in FIG. 3. Each middle segment 161 of the array of cells 103 comprises a gridwork of the middle slotted plates 143 arranged in a rectilinear configuration so as to form a vertical portion of the storage cells 107. In creating the middle segment 161, a first middle slotted plate 143 is arranged vertically. A second middle slotted plate 143 is then arranged above and at a generally 90 degree angle to the first middle slotted plate 143 so that the corresponding slots 163 of the two middle slotted plates 143 are aligned. The second middle slotted plate 143 is then lowered onto the first middle slotted plate 143, thereby causing the slots 163 to interlock as illustrated. This is repeated with all middle slotted plate 143 until the desired rectilinear configuration is created, thereby creating the middle segment 161.

The entire fuel rack body is formed out of three types of slotted plates, a top slotted plate 141, a middle slotted plate 143, a bottom half slotted plate 145, and a bottom full slotted plate 147, which are respectively shown in FIGS. 4A-D. The top slotted plate 141 is formed as half of the middle slotted plate 143. Similarly, the bottom half slotted plate 145 is formed as half of the middle slotted plate 143 with the cut outs 165 added along the remaining slotted edge. The bottom full slotted plate 147 is formed the same as the middle slotted plate 143, but with the cut outs 165 added along one slotted edge. The cut outs 165 serve as auxiliary flow holes for facilitating thermosiphon flow into the storage cells 107 as discussed above. The top slotted plate 141 and the bottom half slotted plate 145 are only used at the top and bottom, respectively, of the array of cells 103 to cap the middle segments 161 (FIG. 3) so that the array of cells 103 has level top and bottom edges.

Each of the slotted plates 141-147 includes a plurality of slots 163, end tabs 167, and indentations 169 adjacent the end tabs 167, all of which are strategically arranged to facilitate sliding assembly to create the array of cells 103. The slots 163 are provided in one or both of the top and bottom edges of the plates 141-147. The slots 163 included on the top edges of the plates 141-147 are aligned with the slots 163 included on the bottom edges of that same plate 141-147. The slots 163 extend through the plates 141-147 for about one-fourth of the height of the plates 141-147. The end tabs 167 extend from lateral edges of the plates 141-147 and are about one-half of the height of the plates 141-147. The end tabs 167 slidably mate with the indentations 169 in the lateral edges of adjacent plates 141-147 that naturally result from the existence of the tabs 167.

By way of example, in creating a middle segment 161 of the array of cells 103, the slots 163 and end tabs 167 of the middle segment 161 interlock with adjacent middle segments 161 so as to prohibit relative horizontal and rotational movement between the adjacent middle segments 161. The middle segments 161 intersect and interlock with one another to form a stacked assembly that is the array of cells 103. The array of cells 103 may include any number of the middle segments 161, with the height of the middle segments 161 in the middle portion 123 of the array of cells 103 being constructed so that the fuel storage section of a fuel assembly may be entirely located within the middle portion 123 of the array of cells 103.

The entire array of cells 103 may thus be formed of slotted plates 141-147 having base configuration, which is the configuration of the middle slotted plate 143, with the top slotted plate 141, the bottom half slotted plate 145, and the bottom full slotted plate 147 being formed by additional minor modifications of the base configuration.

Figure 5:
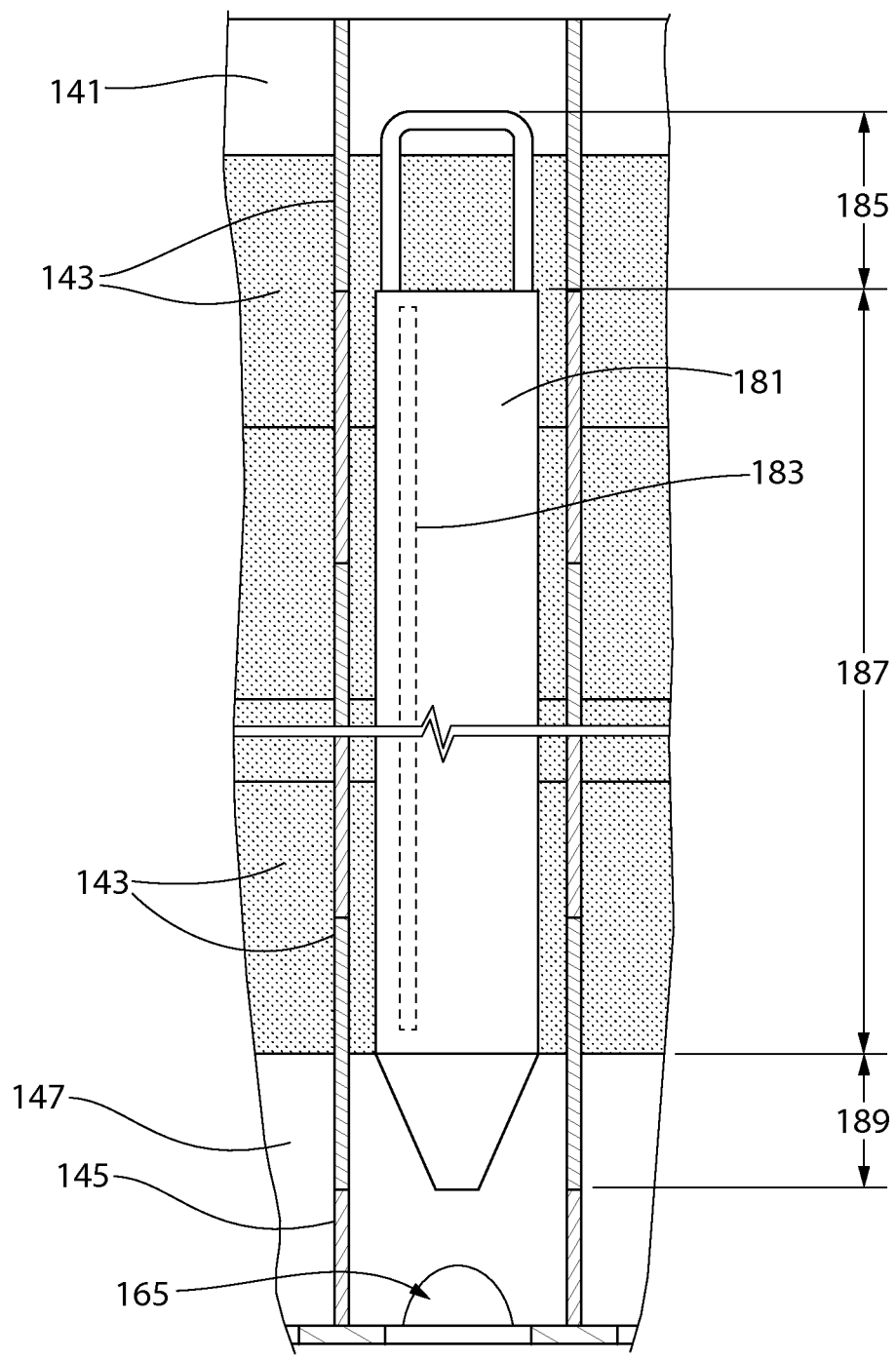
FIG. 5 is a side cross sectional view of a fuel assembly used for the storage of nuclear fuel shown positioned within a storage cell of the fuel rack of FIG. 1.
Figure 6:
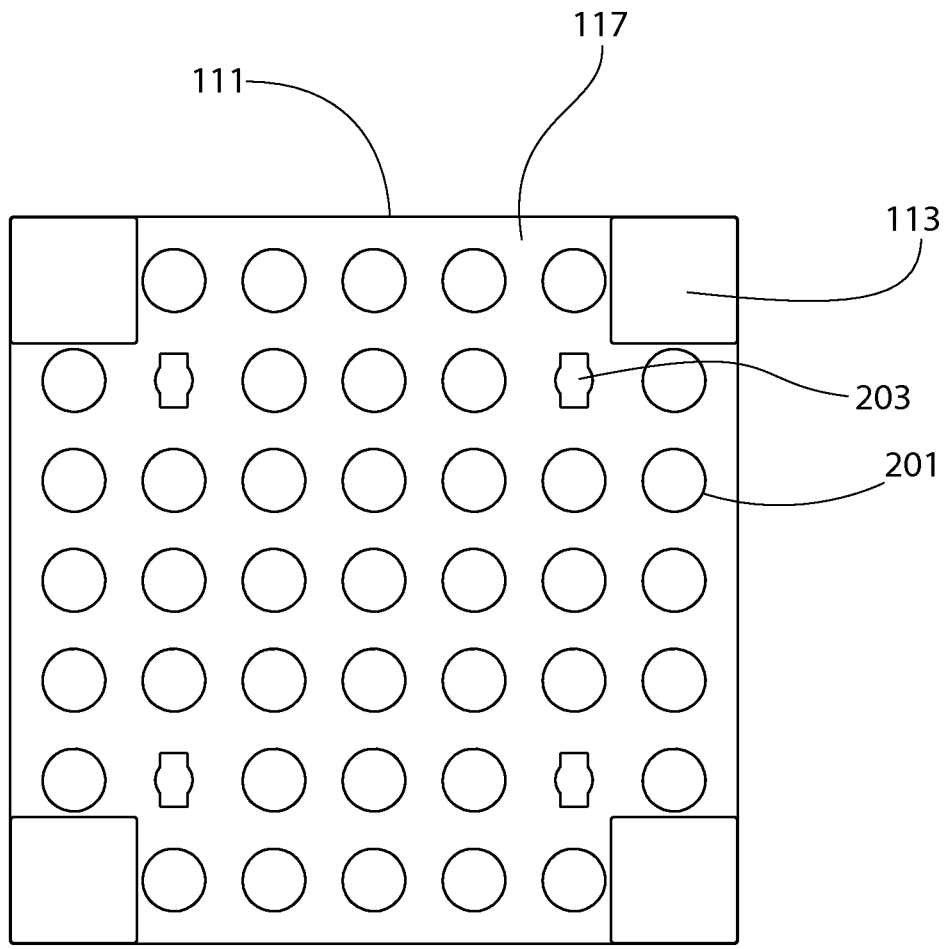
FIG. 6 is a bottom plan view of the fuel rack of FIG. 1.

The profile of a fuel assembly 181, used for the storage of nuclear fuel 183, is shown in FIG. 5 positioned within a storage cell 107 of the array of cells 103. The fuel assembly 181 includes a top section 185, a middle section 187, and a bottom section 189. The nuclear fuel 183 is only stored within the middle section 187 of the fuel assembly 181. The top and bottom sections 185, 189 do not have any nuclear fuel storage capabilities, and thus no nuclear fuel is stored within the top or bottom sections 185, 189. As shown, the middle section 187 of the fuel assembly 181 is stored entirely within the middle portion 123 of the storage cell 107. Thus, the middle section 187 and the nuclear fuel 183 are entirely surrounded on 4 sides with the neutron absorbing material from which the slotted plates 143 of the middle portion 123 are constructed.

The base plate 111, which is shown in FIG. 5, includes a plurality of flow holes 201 extending through the base plate 111 from the bottom surface 117 to the top surface 115. The base plate 111 also includes four oblong holes 203 (second row in from the corners) for lifting and installing the fuel rack 101 within the storage pool. Typically, a special lifting beam with four long reach rods is used to interact with the oblong holes 203 to grapple the fuel rack 101 for transfer into or out of, or movement within, the storage pool.

The flow holes 201 (and oblong holes 203) create passageways from below the base plate 111 into the bottom ends of the storage cells 107. As shown, a single flow hole 201 is provided for each storage cell 107. In certain embodiments, multiple flow holes 201 may be provided for each storage cell 107 to provide cooling fluid to the storage cell 107. The flow holes 201 serve as fluid inlets to facilitate natural thermosiphon flow of pool water through the storage cells 107 when fuel assemblies having a heat load are positioned therein. More specifically, when heated fuel assemblies are positioned in the storage cells 107 in a submerged environment, the water within the storage cells 107 surrounding the fuel assemblies becomes heated, thereby rising due to increased buoyancy. As this heated water rises and exits the storage cells 107 via their open top ends, cool water is drawn into the bottom of the storage cells 107 via the flow holes 201. This heat induced water flow along the fuel assemblies then continues naturally.

Figure 7:
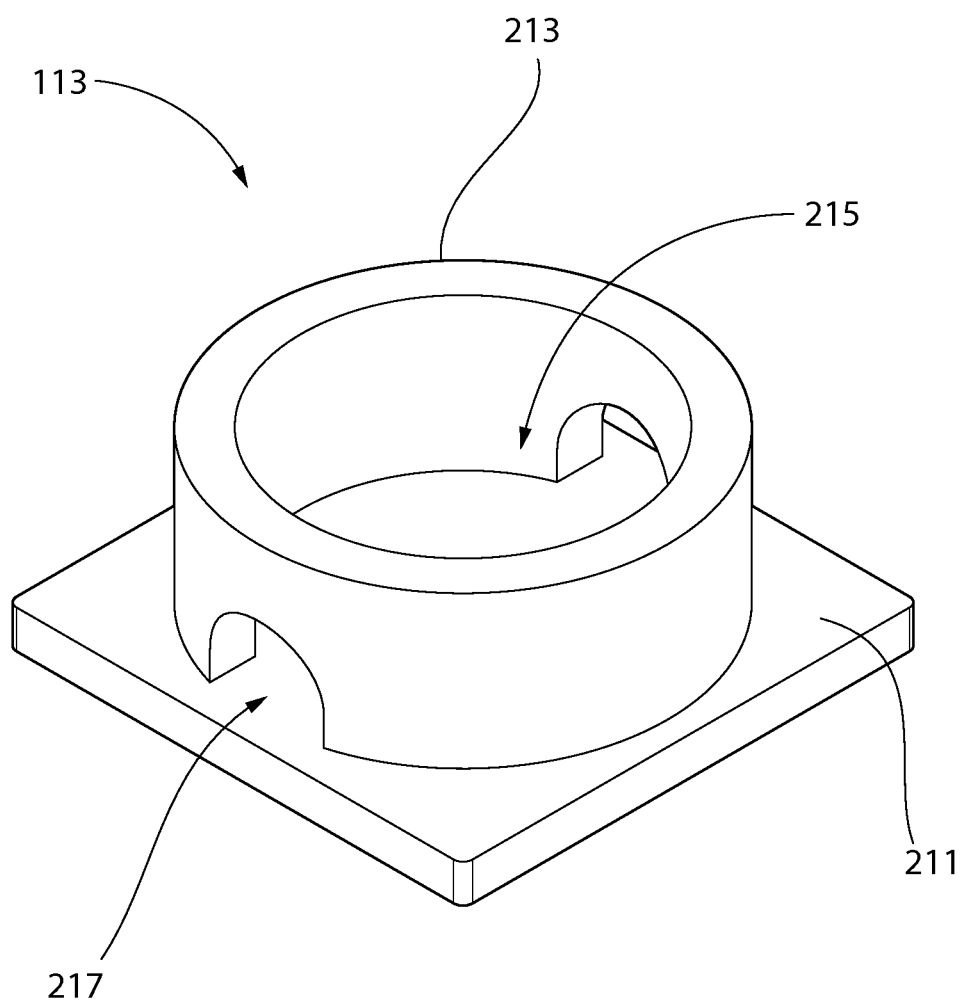
FIG. 7 is a perspective view of a support pedestal of the fuel rack of FIG. 1.

A support pedestal 113 for the fuel rack 101 is shown in FIG. 7. The support pedestals 113 affixed to the bottom surface 115 of the base plate 111 ensure that a space exists between a floor of a storage pool and the bottom surface 115 of the base plate 111, thereby creating an inlet plenum for water to flow through the flow holes 201. The support pedestal 113 includes a base portion 211 and a riser portion 213 formed about an interior flow space 215. The riser portion 213 includes flow apertures 217 through which water from the storage pool may pass from a space external to the support pedestal 113 into the interior flow space 215. Water passing into the interior flow space 215 may then pass up through a flow hole 201 in the base plate 111 to enable the cooling process described above. Although the riser portion 213 is depicted as being annular, in certain embodiments the riser portion 213 may have any geometrical configuration which supports the base plate 111 above the floor of the storage pool and permits water from the storage pool to flow into any flow holes 201 in the base plate 111 near which the support pedestal 113 may be affixed.

Figure 8:
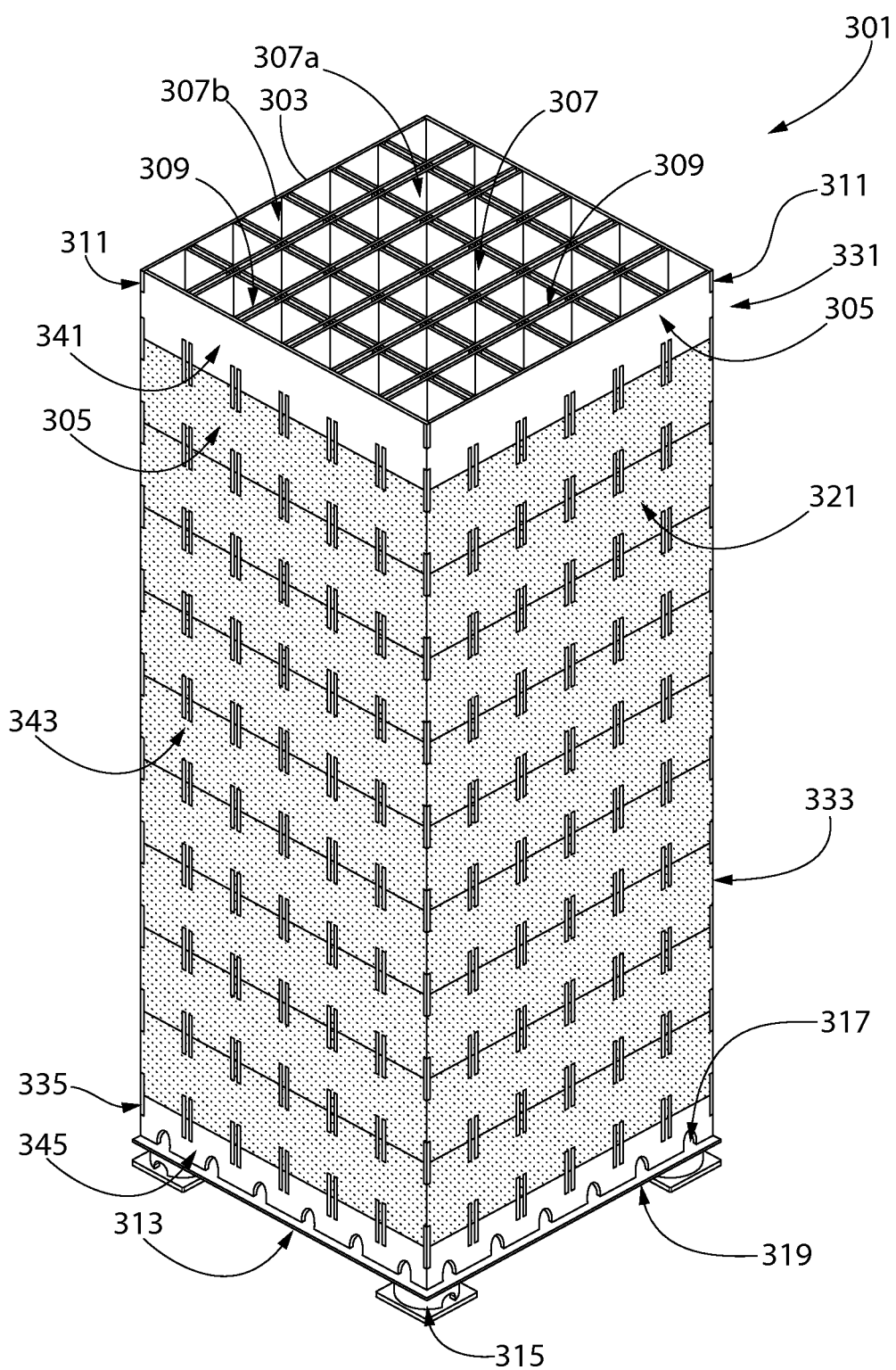
FIG. 8 is perspective view of a second fuel rack for nuclear fuel assemblies.

Another embodiment of a fuel rack 301 including an array of cells 303 is shown in FIG. 8. The array of cells 303 is formed by slotted plates 305 arranged in interlocking arrangement. In the embodiment shown, each storage cell 307 in the array of cells 303 has a square profile in plan view, with all the cells having the same dimensions. However, in certain embodiments, each storage cell 307 in the array of cells 303 may have an alternative profile shape, including a rectangular profile shape and a hexagonal profile shape, among others. In certain embodiments, the storage cells 307 in the array of cells 303 may vary in size. The slotted plates 305 are also arranged so that flux traps 309 are formed around the entire profile of each interior storage cell 307*a*. The external walls of each exterior storage cell 307*b* does not include flux traps.

The fuel rack 301 also includes tie members 311 affixed to the array of cells 303 to extend along the external surface of the array of cells 303. The tie members extend substantially the entire height of the array of cells 303 to provide vertical stiffness to the interlocking slotted plates 305. In certain embodiments, the tie members 311 may be located within the storage cells 307 and affixed to the array of cells 303. In still other embodiments, smaller coupling elements may be used which couple adjacent ones of the slotted plates 305 together instead of the tie members 311. The fuel rack 301 also includes a base plate 313, and the array of cells 303 is connected to a top surface 317 of the base plate 313.

Support pedestals 315 are coupled to the bottom surface 319 of the base plate 313. The support pedestals 315 provide space underneath the base plate 313 for the circulation of fluid up and through the array of cells 303.

Figure 10A:
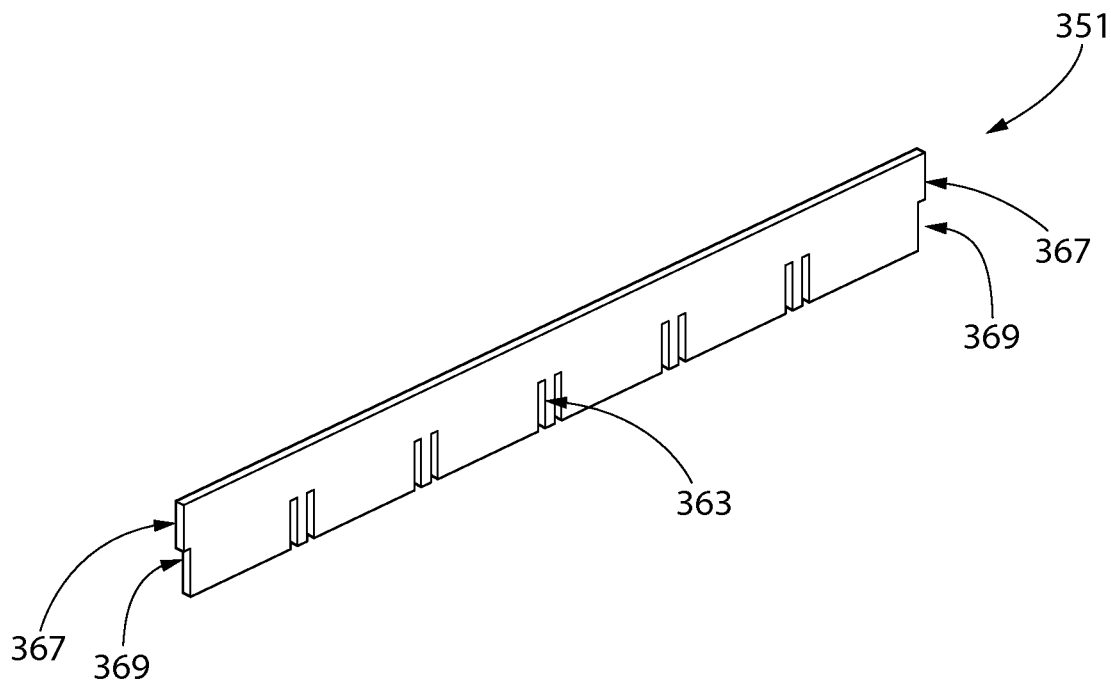
FIG. 10A-D are slotted plates for the fuel rack of FIG. 8.
Figure 10B:
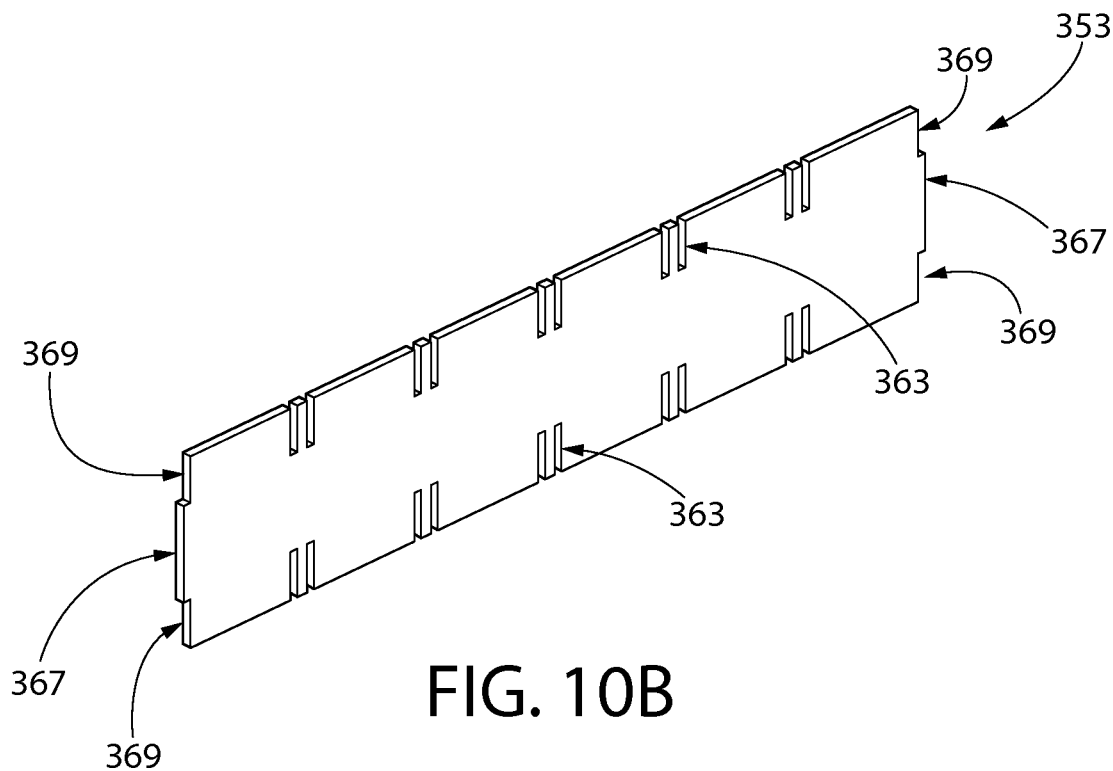
Figure 10C:
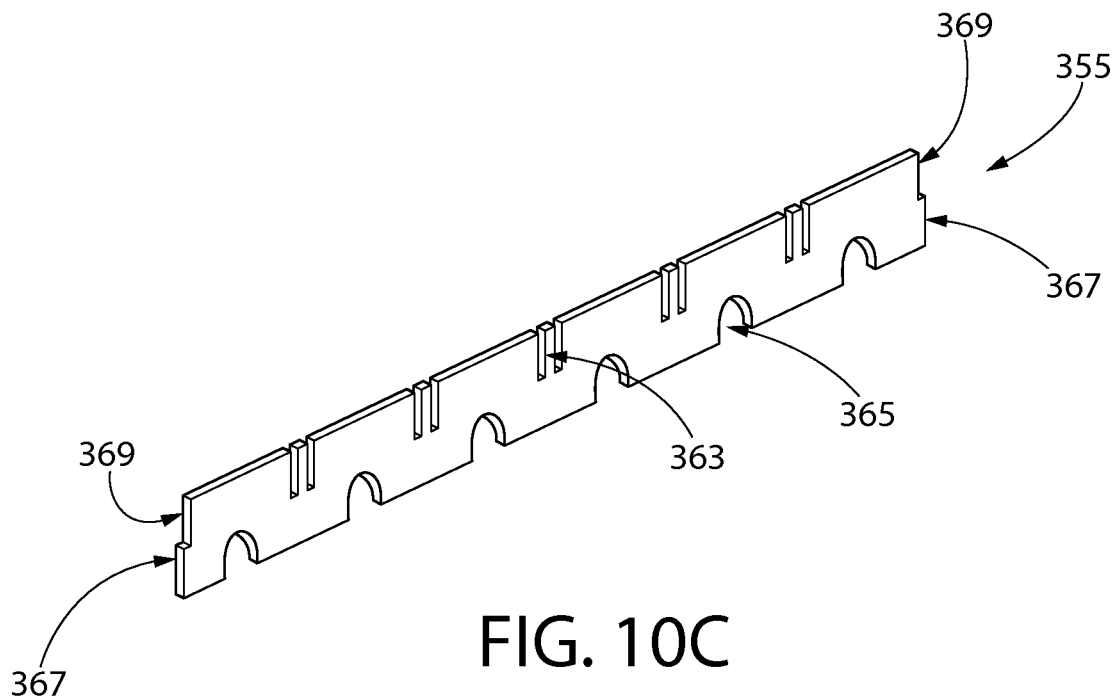
Figure 10D:
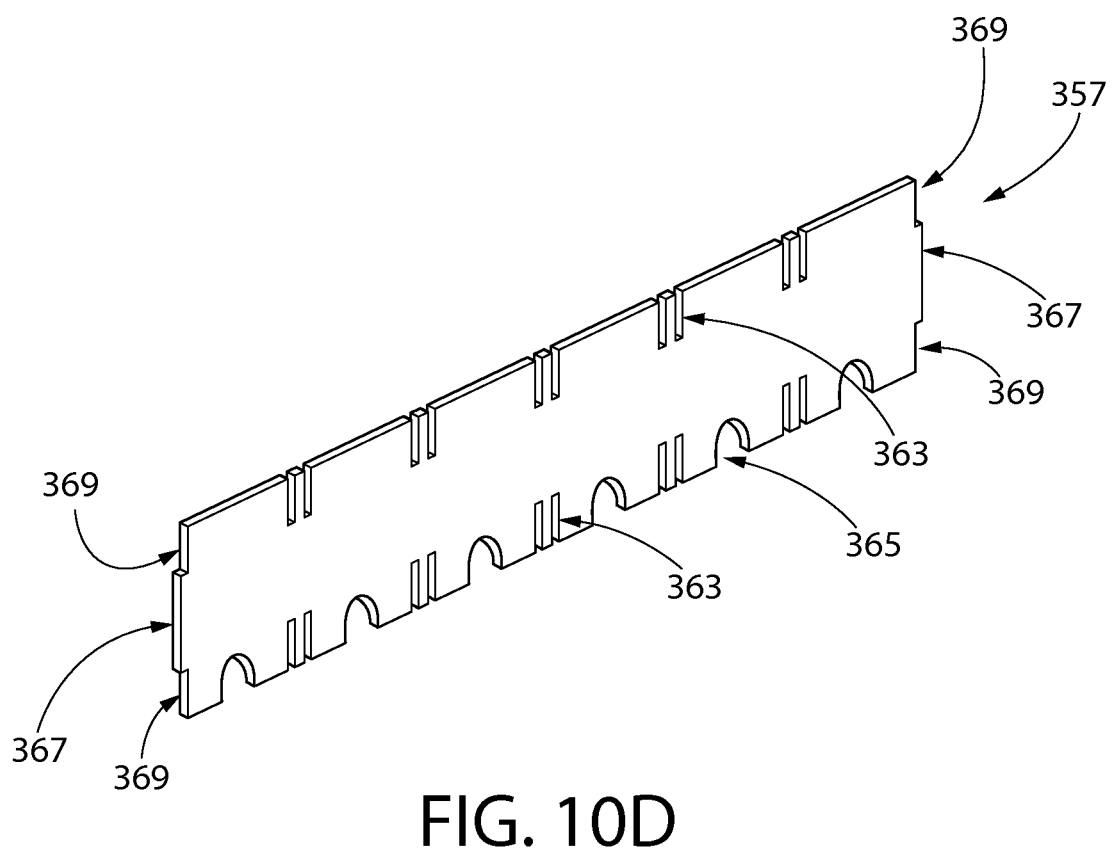

The array of cells 303 is shown separated into a top portion 331, a middle portion 333, and a bottom portion 335. The entire array of cells 303 may be formed out of four different types of slotted plates. A plurality of first slotted plates 341 are slidably interlocked with one another to form the top portion 331 of the array of cells 303; a plurality of second slotted plates 343 are slidably interlocked with one another to form the middle portion 333 of the array of cells 303; and a plurality of third slotted plates 345 are slidably interlocked with one another to form the top portion 335 of the array of cells 303. Each of the plurality of first, second, and third slotted plates 341, 343, 345 include one or more of the types of slotted plates shown in FIGS. 10A-D. In the top portion 331, the plurality of first slotted plates 341 includes a plurality of top slotted plates 351 (FIG. 10A) and a plurality of middle slotted plates 353 (FIG. 10B); in the middle portion 333, the plurality of second slotted plates 343 includes a plurality of the middle slotted plates 353 (FIG. 10B); and in the bottom portion 335, the plurality of third slotted plates 345 includes a plurality of bottom half slotted plates 355 (FIG. 10C) and a plurality of bottom full slotted plates 357 (FIG. 10D).

The plurality of first slotted plates 341 and the plurality of third slotted plates 345 are constructed from a first material, and the plurality of second slotted plates 343 are constructed from a second material which is metallurgically incompatible with the first material. In certain embodiments, the first material may be stainless steel and the second material may be a metal matrix composite material. The metal matrix composite material may be, in certain embodiments, a aluminum/boron carbide metal matrix composite material, an non-limiting example of which is a boron impregnated aluminum, such as the metal matrix composite material sold under the tradename Metamic®. The tie members 311, the base plate 313, and the pedestals 315, in certain embodiments, are also formed from the first material.

The plurality of first slotted plates 341 of the top portion 331 are welded together along adjacent edges. Welding the plurality of first slotted plates 341 provides overall structure to the top portion 331 of the array of cells 303. The plurality of third slotted plates 345 of the bottom portion 335 are coupled to the base plate 313. In certain embodiments, the plurality of third slotted plates 345 may be welded to the base plate 313. By welding the plurality of third slotted plates 345 to the base plate 313, the base plate 313 is provided with additional flexural strength, which may be needed when the storage rack 301 is loaded with fuel assemblies. In certain embodiments, the plurality of third slotted plates 345 may also be welded together along adjacent edges. Conventional welding materials and processes may be used for these welds when the first material is stainless steel. The plurality of second slotted plates 343 may be welded together at intersecting slots, insofar as a welding process is known for the second material.

The tie members 311 extend along an external surface 321 of the array of cells 303 and are affixed to the top portion 331 and the bottom portion 335 of the array of cells 303. Particularly, the tie members 311 are affixed to one or more of the plurality of first slotted plates 341 and to one or more of the plurality of first slotted plates 345 that are outward-facing. The tie members 311 may be affixed to the top portion 331 and the bottom portion 335 by welding. The tie members 311 therefore need not be directly affixed to any of the plurality of second slotted plates 343 in the middle portion 333 of the array of cells 303 to stabilize the entire array of cells 303. In certain embodiments, fasteners such as screws and/or brackets may couple the tie members 311 to the top portion 331 and/or the bottom portion 335 of the array of cells 303.

As shown, the tie members 311 are affixed to corners of the array of cells 303, and only four tie members 311 are shown in the depicted embodiment. In certain embodiments, the tie members 311 may be affixed at different locations on the array of cells 303. And in certain embodiments, more or fewer tie members 311 may be used.

Figure 9:
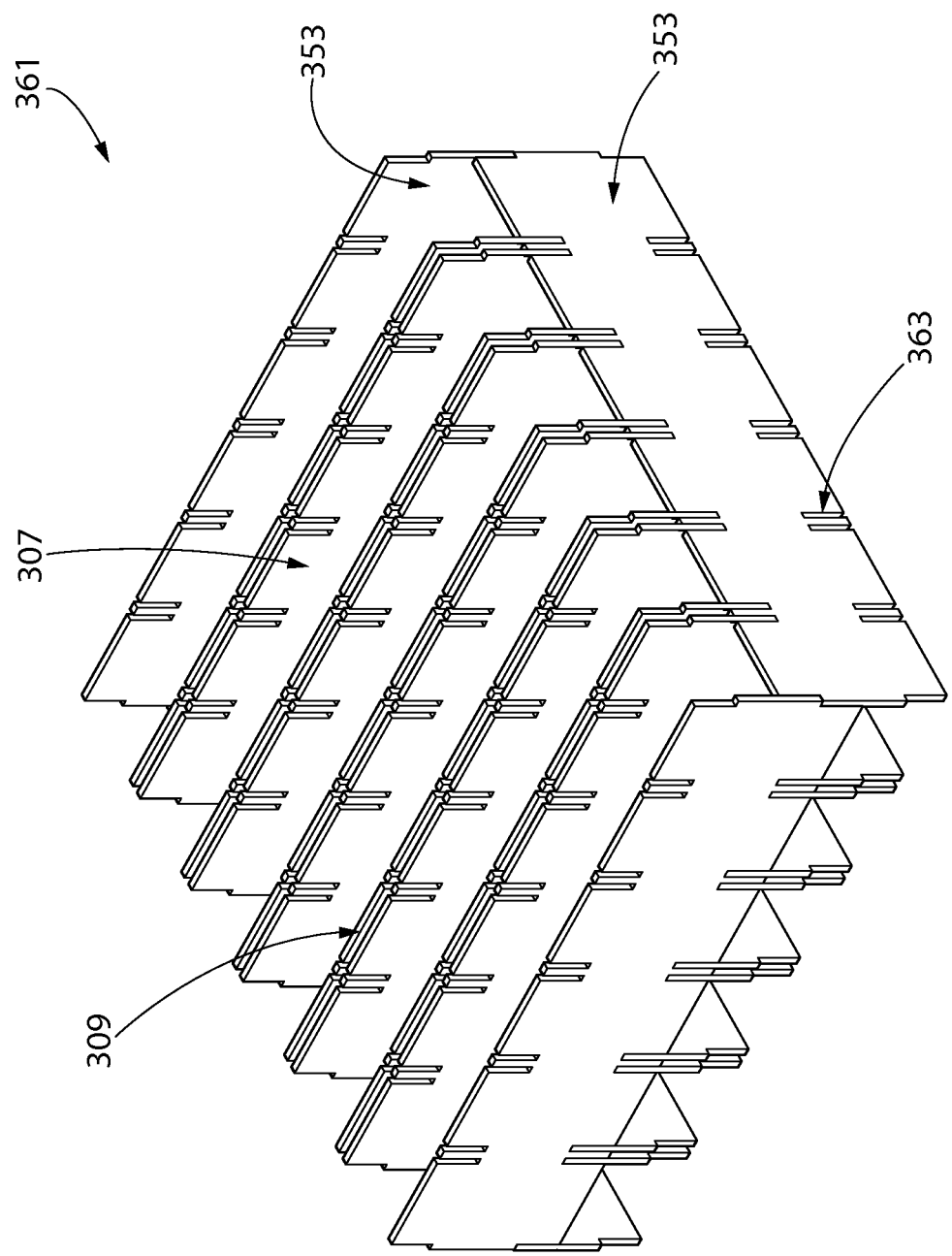
FIG. 9 is a perspective view of interlocked slotted plates for the fuel rack of FIG. 8.

A middle segment 361 of the middle portion 333 of the array of cells 303 is shown in FIG. 9. Each middle segment 361 of the array of cells 303 comprises a gridwork of the middle slotted plates 353 arranged in a rectilinear configuration so as to form a vertical portion of the storage cells 307 and the flux traps 309. In creating the middle segment 361, a first middle slotted plate 353 is arranged vertically. A second middle slotted plate 353 is then arranged above and at a generally 90 degree angle to the first middle slotted plate 353 so that the corresponding slots 363 of the two middle slotted plates 353 are aligned. The second middle slotted plate 353 is then lowered onto the first middle slotted plate 353, thereby causing the slots 363 to interlock. This is repeated with all middle slotted plate 353 until the desired rectilinear configuration is created, thereby creating the middle segment 361 having the storage cells 307 and the flux traps 309.

The entire fuel rack body is formed out of three types of slotted plates, a top slotted plate 351, a middle slotted plate 353, a bottom half slotted plate 355, and a bottom full slotted plate 357, which are respectively shown in FIGS. 10A-D. The top slotted plate 351 is formed as half of the middle slotted plate 353. Similarly, the bottom half slotted plate 355 is formed as half of the middle slotted plate 353 with the cut outs 365 added along the remaining slotted edge. The bottom full slotted plate 357 is formed the same as the middle slotted plate 353, but with the cut outs 365 added along one slotted edge. The cut outs 365 serve as auxiliary flow holes for facilitating thermosiphon flow into the storage cells 307 as discussed above. The top slotted plate 351 and the bottom half slotted plate 355 are only used at the top and bottom, respectively, of the array of cells 303 to cap the middle segments 361 (FIG. 9) so that the array of cells 303 has level top and bottom edges.

Each of the slotted plates 351-357 includes a plurality of slots 363, end tabs 367, and indentations 369 adjacent the end tabs 367, all of which are strategically arranged to facilitate sliding assembly to create the array of cells 303. The slots 363 are provided in one or both of the top and bottom edges of the plates 351-357. The slots 363 included on the top edges of the plates 351-357 are aligned with the slots 363 included on the bottom edges of that same plate 351-357. The slots 363 extend through the plates 351-357 for about one-fourth of the height of the plates 351-357. The end tabs 367 extend from lateral edges of the plates 351-357 and are about one-half of the height of the plates 351-357. The end tabs 367 slidably mate with the indentations 369 in the lateral edges of adjacent plates 351-357 that naturally result from the existence of the tabs 367.

By way of example, in creating a middle segment 361 of the array of cells 303, the slots 363 and end tabs 367 of the middle segment 361 interlock with adjacent middle segments 361 so as to prohibit relative horizontal and rotational movement between the adjacent middle segments 361. The middle segments 361 intersect and interlock with one another to form a stacked assembly that is the array of cells 303. The array of cells 303 may include any number of the middle segments 361, with the height of the middle segments 361 in the middle portion 333 of the array of cells 303 being constructed so that the fuel storage section of a fuel assembly may be entirely located within the middle portion 333 of the array of cells 303.

The entire array of cells 303 may thus be formed of slotted plates 351-357 having base configuration, which is the configuration of the middle slotted plate 353, with the top slotted plate 351, the bottom half slotted plate 355, and the bottom full slotted plate 357 being formed by additional minor modifications of the base configuration. Furthermore, as a result of the interlocking nature of the slotted plates 351-357, spacers are not needed to maintain the flux traps 309. Thus, in certain embodiments, the array of cells 303 may be free of spacers in the flux traps 309.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A fuel rack for nuclear fuel assemblies, the fuel rack comprising:
   a top;
   a plurality of vertically-extending corners;
   a base plate; and
   an array of cells for holding fuel assemblies, the array of cells comprising:
      a plurality of horizontal first slotted plates slidably interlocked with one another to form a top portion of the array of cells, the plurality of first slotted plates being formed of a first material;
      a plurality of horizontal second slotted plates slidably interlocked with one another to form a middle portion of the array of cells, outermost ones of the second slotted plates forming an exposed external surface of the middle portion of the array of cells, each of the plurality of second slotted plates being formed of a second material, wherein the second material is a neutron absorbing material and the first and second materials are metallurgically incompatible with one another; and
      a plurality of horizontal third slotted plates slidably interlocked with one another to form a bottom portion of the array of cells, the plurality of third slotted plates formed of the first material and connected to a top surface of the base plate;
      wherein outermost ones of the slotted first, second, and third plates in the top, bottom, and middle portions are arranged perimetrically around the fuel rack, the outermost ones each comprising an outward facing major surface which collectively form planar sidewalls of the fuel rack which extend from corner to corner and from the top to the base plate of the fuel rack.

2. The fuel rack according to claim 1, further comprising a plurality of tie members extending along the exposed external surface of the middle portion of the array of cells and, an exposed external surface of the top and bottom portions of the array of cells, wherein the tie members are affixed to one or more of the plurality of first slotted plates and one or more of the plurality of third slotted plates.

3. The fuel rack according to claim 2, wherein the tie members are welded to the one or more of the plurality of first slotted plates and the one or more of the plurality of third slotted plates, and wherein the tie members are not directly affixed to any of the plurality of second slotted plates.

4. The fuel rack according to claim 3, wherein the plurality of second slotted plates comprise a plurality of first middle slotted plates and a plurality of second middle slotted plates oriented perpendicular to the plurality of first middle slotted plates, wherein each of the plurality of first middle slotted plates extends uninterrupted from a first side of the exposed external surface of the array of cells to a second side of the exposed external surface of the array of cells that is opposite the first side, and wherein each of the plurality of second middle slotted plates extends uninterrupted from a third side of the exposed external surface of the array of cells to a fourth side of the exposed external surface of the array of cells that is opposite the third side.

5. The fuel rack according to claim 1, wherein the plurality of third slotted plates are welded to the top surface of the base plate.

6. The fuel rack according to claim 1, wherein the second material is a metal matrix composite material.

7. The fuel rack according to claim 1, wherein the plurality of second slotted plates are welded together.

8. The fuel rack according to claim 1, wherein the first material is stainless steel and second material is a boron impregnated aluminum.

9. The fuel rack according to claim 1, wherein the plurality of first slotted plates are welded together and the plurality of third slotted plates are welded together.

10. The fuel rack according to claim 1, wherein the plurality of second slotted plates are stacked vertically atop one another to form the middle portion of the array of cells.

11. A nuclear fuel storage apparatus comprising:
a fuel assembly having a top section, a middle section, and a bottom section, nuclear fuel being stored within the middle section; and
a fuel rack comprising:
a top;
a plurality of vertically-extending corners;
a base plate; and
an array of cells, the fuel assembly located in a first cell of the array of cells, the array of cells comprising:
a plurality of horizontal first slotted plates slidably interlocked with one another to form a top portion of the array of cells, the plurality of first slotted plates being formed of a first material, outermost perimetrically arranged ones of the plurality of first slotted plates forming exposed external surfaces of the middle portion of the array of cells;
a plurality of horizontal second slotted plates slidably interlocked with one another to form a middle portion of the array of cells, outermost perimetrically arranged ones of the plurality of second slotted plates forming exposed external surfaces of the middle portion of the array of cells, each of the plurality of second slotted plates being formed of a second material and welded together, wherein the second material is a neutron absorbing material and the first and second materials are metallurgically incompatible, the middle section of the fuel assembly being located entirely within the middle portion of the first cell of the array of cells; and
a plurality of horizontal third slotted plates slidably interlocked with one another to form a bottom portion of the array of cells, the plurality of third slotted plates formed of the first material and connected to a top surface of the base plate, outermost ones of the plurality of second slotted plates being perimetrically arranged forming exposed external surfaces of the middle portion of the array of cells;
wherein the exposed external surfaces of the top, middle, and bottom portions collectively form planar sidewalls of the fuel rack which extend from corner to corner and from the top to the base plate of the fuel rack.

12. The apparatus according to claim 11, further comprising a plurality of tie members extending along the exposed external surface of the middle portion of the array of cells and the exposed external surface of the top and bottom portions of the array of cells, wherein the tie members are affixed to each of the top and bottom portions of the array of cells.

13. The apparatus according to claim 12, wherein the tie members are welded to the top and bottom portions of the array of cells, and wherein the tie members are not directly affixed to the middle portion of the array of cells.

14. The apparatus according to claim 12, wherein the plurality of second slotted plates are stacked vertically atop one another to form the middle portion of the array of cells.

15. The apparatus according to claim 11, wherein the plurality of third slotted plates are welded to the top surface of the base plate.

16. The apparatus according to claim 11, wherein the plurality of second slotted plates are constructed of a metal matrix composite material.

17. The apparatus according to claim 11, wherein the array of cells comprises a plurality of inner storage cells and a plurality of perimeter storage cells, each of the plurality of inner storage cells and each of the plurality of perimeter storage cells defined by a plurality of walls, and wherein each of the plurality of walls of each of the inner storage cells and each of the perimeter storage cells is formed of the second material within the middle portion of the array of cells.

18. The apparatus according to claim 11, wherein the plurality of first and third slotted plates are constructed of stainless steel and wherein the plurality of second slotted plates are constructed of a boron impregnated aluminum.

19. The apparatus according to claim 11, wherein the plurality of first slotted plates are welded together and the plurality of third slotted plates are welded together.

20. The apparatus according to claim 11, wherein the plurality of second slotted plates are interlocked with one another to form flux traps between adjacent cells in the array of cells.

21. A fuel rack for nuclear fuel assemblies, the fuel rack comprising:
a top;
a plurality of vertically-extending corners;
a base plate;
an array of cells for holding fuel assemblies, the array of cells comprising:

a plurality of horizontal first slotted plates slidably interlocked with one another to form a top portion of the array of cells, the plurality of first slotted plates being welded together and formed of a first material;

a plurality of horizontal second slotted plates slidably interlocked with one another to form a middle portion of the array of cells, the plurality of second slotted plates being formed of a second material, wherein the second material is a neutron absorbing material and the first and second materials are metallurgically incompatible; and a plurality of horizontal third slotted plates slidably interlocked with one another to form a bottom portion of the array of cells, the plurality of third slotted plates formed of the first material and welded to a top surface of the base plate;

wherein outermost ones of the plurality of first, second, and third slotted plates extend perimetrically around the fuel rack, the outermost ones each comprise outward facing plates having first major surfaces that collectively form exposed external planar sidewalls of the array of cells, each sidewall extending from corner to corner and from the top to the base plate of the fuel rack; and a plurality of tie members, each tie member welded to the exposed external surface of the array of cells along each of the top and bottom portions of the array of cells.

22. The fuel rack according to claim 21, wherein the tie members are not directly affixed to any of the plurality of second slotted plates, one each of the tie members being located at one of the corners.

23. The fuel rack according to claim 21, wherein the plurality of second slotted plates are constructed of a boron impregnated aluminum and the plurality of first and third slotted plates are constructed of stainless steel.

24. The fuel rack according to claim 21, wherein the plurality of second slotted plates are welded together.

25. The fuel rack according to claim 21, wherein the array of cells comprises a plurality of storage cells including a plurality of perimeter storage cells and a plurality of inner storage cells each defined by a plurality of walls, and wherein the outward facing plates form at least one of the plurality of walls of each of the plurality of perimeter storage cells, the outward facing plates comprising second major surfaces opposite the first major surfaces, the second major surfaces facing the perimeter storage cells.

26. The fuel rack according to claim 21, wherein the exposed external surface of the array of cells comprises a first side, a second side opposite the first side, a third side extending between the first and second sides, and a fourth side extending between the first and second sides and being opposite the third side, and wherein each of the tie members is a monolithic structure located along a corner of the array of cells and extending along a portion of two adjacent sides of the exposed external surface of the array of cells.

27. The fuel rack according to claim 21, wherein a plurality of horizontally extending joints are formed between stacked tiers of the outermost ones of the slotted first, second, and third plates.

28. The fuel rack according to claim 27, wherein the horizontal extending joints extend continuously form corner to corner.

* * * * *